July 15, 1969 R. S. TUTTLE 3,455,560

TWO-SPEED TURNTABLE FOR AUTOMATIC PHONOGRAPH

Filed June 30, 1966 4 Sheets-Sheet 1

Inventor
Robert S. Tuttle
By: Olson, Trexler, Wolters & Bushnell Attys.

July 15, 1969 R. S. TUTTLE 3,455,560

TWO-SPEED TURNTABLE FOR AUTOMATIC PHONOGRAPH

Filed June 30, 1966 4 Sheets-Sheet 2

Inventor
Robert S. Tuttle
By: Olson, Trexler, Wolters & Bushnell
Attys

TWO-SPEED TURNTABLE FOR AUTOMATIC PHONOGRAPH

Inventor
Robert S. Tuttle
By: Olson, Trexler, Wolters & Bushnell attys.

July 15, 1969 R. S. TUTTLE 3,455,560

TWO-SPEED TURNTABLE FOR AUTOMATIC PHONOGRAPH

Filed June 30, 1966 4 Sheets-Sheet 4

Inventor
Robert S. Tuttle
By: Olson, Trexler, Wolters & Bushnell attys 3,455,560
TWO-SPEED TURNTABLE FOR AUTOMATIC PHONOGRAPH Robert S. Tuttle, Eggertsville, N.Y., assignor to The Wurlitzer Company, Chicago, Ill., a corporation of Ohio Filed June 30, 1966, Ser. No. 561,768
Int. Cl. G11b *17/12*
U.S. Cl. 274—10 14 Claims

ABSTRACT OF THE DISCLOSURE

A two-speed phonograph turntable construction comprising a turntable mounted for rotation and capable of being driven at two speeds. The turntable includes a retractable large diameter spindle coaxially mounted relative to the turntable and a retractable small diameter spindle extending axially beyond the large diameter spindle. Latching means are provided to maintain the large diameter spindle in a projected position until a record having a small diameter center hole is placed on the turntable. Upon placing such a record thereon, means interconnecting the small diameter spindle and the latching means are operated to unlatch the latter and cause the large diameter spindle to be retracted. The turntable construction further includes means operatively connected to the small diameter spindle to operate a switch which controls the rotational speed of the turntable.

This invention relates to a two-speed turntable adapted for use in an automatic coin-operated phonograph, and particularly to the spindle mechanism thereof.

Most popular records of the type commonly played on automatic coin-operated phonographs or "juke boxes" are designed for operation at 45 r.p.m., and have rather large center holes, on the order of 1½" diameter. However, it is frequently desirable to play 33⅓ records on the same phonograph. Such records are of the same 7" outside diameter as the 45 r.p.m. records, and frequently are referred to as "Little LP's." Such records have much smaller center holes, being on the order of ¼ to ⁵⁄₁₆" diameter. The difference in center hole diameter is of value in controlling automatic mechanism to set the proper speed of the turntable in correlation with the speed at which the record is designed to be played. However, it does present some problems in handling the record on the turntable.

It has been known heretofore to provide a turntable with a large center spindle for accommodating 45 r.p.m. records, the large spindle having a smaller central portion adapted to fit into the center holes of 33⅓ r.p.m. records. The large spindle typically has been spring biased to a forward or extended position, and when 45 r.p.m. records are placed on the turntable they simply fit over the large spindle. When a 33⅓ r.p.m. record is positioned concentric with the turntable, the small diameter spindle portion fits into the hole, but the record must then push the large spindle portion back against its spring biasing. The records in question are rather light in weight, and the weight of the record itself cannot reliably be depended upon to effect the necessary shifting of the spindle. Actual pushing of the record into place axially against the turntable will overcome this unreliability, but this requires added parts and puts an undue strain on the record.

Accordingly, it is an object of the present invention to provide a two-speed automatic phonograph turntable having large and small diameter spindles with the large diameter spindle normally in advanced, operating position, and wherein very little force is required in the positioning of a small-center hole record to cause withdrawal of the large diameter spindle.

More specifically, it is an object of the present invention to provide a two-speed turntable having large and small diameter spindles wherein the large diameter spindle is positively latched in operating position and is unlatched by the positioning of a small-center hole record on the turntable.

It is yet another specific object of the present invention to provide a two-speed phonograph turntable having two spindles of different diameters with the larger diameter spindle latched in extended, operating position and spring biased away from such position, movement of a small center hole record into playing position on the turntable effecting unlatching of the large diameter spindle for spring urged movement to retracted position.

Yet another object of the present invention is to provide a two-speed turntable in an automatic phonograph, said turntable having large and small diameter spindles wherein an axially advancing force is applied to the spindles at the end of each record playing operation to urge the large diameter spindle toward extended, operating position.

Other and further objects and advantages of the present invention will be apparent from the following description when taken in connection with the accompanying drawings wherein.

Figures 1, 2:
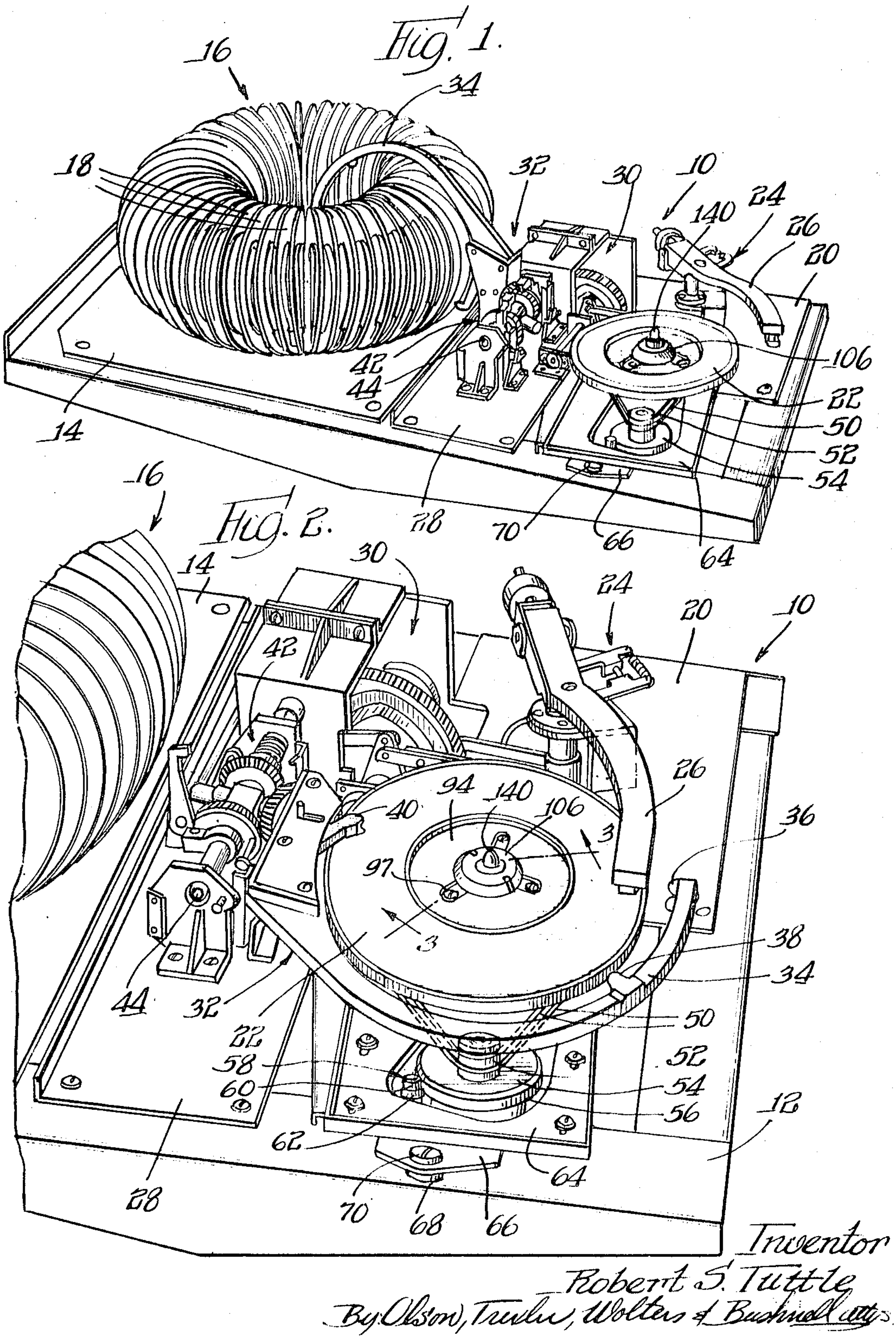
FIG. 1 is a perspective view of an automatic record changer incorporating the present invention.
FIG. 2 is a perspective view of a portion of FIG. 1 on an enlarged scale, showing the two-speed turntable and certain related apparatus.

Turning now in greater particularity to the drawings, and first to FIGS. 1 and 2, there is shown a record changer mechanism designated generally by the numeral 10 and including a supporting frame 12. A plate or subbase 14 is supported from the frame and carries a record magazine or basket 16 thereon for rotation about a vertical axis. The magazine carries a plurality of records 18 in more or less doughnut or toroidal shape with the records disposed radially of the axis of rotation. The details of the record magazine are not particularly important to the present invention.

For those who are interested in such details, they can be found in copending applications Ser. No. 619,687, Changer and Selector Mechanism, filed in the names of Fred H. Osborne, Robert S. Tuttle and Michael J. Corbett; and Ser. No. 619,686 for Electro-Mechanical Selector Unit, filed in the names of Frank B. Lumney and Ronald P. Eberhardt.

A sub-base or plate 20 is supported from the frame 12 adjacent the right end thereof as viewed in FIGS. 1 and 2. A turntable 22 incorporating the subject matter of the present invention is rotatably mounted on a subbase 64 supported on the frame 12 and on the plate 20, and considerably more will be said about this hereinafter. A reproducing unit 24 including a tone arm 26 is pivotally mounted from the plate 20, and this is of generally conventional construction.

An intermediate base plate 28 is supported from the frame between the plates 14 and 20. A main drive and control unit 30 is supported from this plate and is driven by a suitable electric motor (not shown). Also mounted on the plate 28 is a record extracting and positioning mechanism 32 including a claw 34 normally radially spanning a record in the magazine 16, as shown in FIG. 1. As may be seen in FIG. 1, and perhaps better in FIG. 2, the claw 34 is substantially semi-circular or scythe shaped, having toward its outer end gripper members 36 and 38. The claw further has at its inner end a gripper finger 40. Various control mechanisms 42 are provided for moving the finger 40 toward the gripper members 36 and 38 to grip a record substantially diametrically with the claw in the position of FIG. 1. The control mechanism 42 as driven by the main drive and control unit 30 then pivots the claw substantially 180° about a horizontal axis 44, turning the claw 90° to one side or the other according to which side of the record is to play, and places the record face-up, centered on the turntable 22. Various mechanisms are known in the art which would be satisfactory for extracting records and placing them on the turntable. A preferred mechanism is shown in the aforementioned Osborne et al., Ser. No. 619,687.

The turntable 22 is designed to be driven at either of two speeds, in the present example either 33⅓ r.p.m. or 45 r.p.m. For purposes of driving the turntable, the turntable is provided with a depending skirt 46 (see FIG. 3) having a cylindrical outer surface witth a depressed guideway or drive surface 48 of lesser diameter. A pair of rubber belts or O-rings 50, each of circular cross-section, is received over the driving surface 48 of the depending skirt 46, and also over a driving pulley 52 (FIGS. 1 and 2) which is fixed for rotation with an idler wheel 54. The idler wheel 54 is provided with a rubber tire 56 which bears against a drive spindle 58. The drive spindle has a relatively small diameter driving surface 60, and a relatively larger diameter driving surface 62. The idler wheel 54 is axially shiftable to cause the rubber tire 56 to ride against one or the other of the drive surfaces 60, 62 to drive the idler wheel, and hence the turntable at either of the two desired speeds. Mechanisms are known in the art for effecting such axial shifting to produce the two-speed drive, and one preferred form is shown in the copending application of Fred H. Osborne and Robert S. Tuttle, Ser. No. 450,680, now Patent No. 3,393,915, filed April 26, 1965, for "Two-Speed Phonograph Drive."

The turntable, although mounted from the plate 20, is carried from a sub-base or plate 64. The plate 64 is provided at the forward end as seen in FIGS. 1 and 2 with a forwardly extending bracket 66 having a boss 68 thereon. The boss is mounted on a stud 70 permanently mounted in the frame 12. The opposite or rear portion of the sub-base or plate 64 is provided with depending rollers riding on plate 20. This allows shifting of the turntable radially toward and away from the mechanism 42 and magazine 16 to facilitate the depositing and picking up of a record relative to the turntable. The particular mechanism by which the sub-base or plate 64 is mounted and operated does not form a part of the present invention, but will be found in the aforementioned Osborne et al., Ser. No. 619,687.

Figures 7, 8, 9:
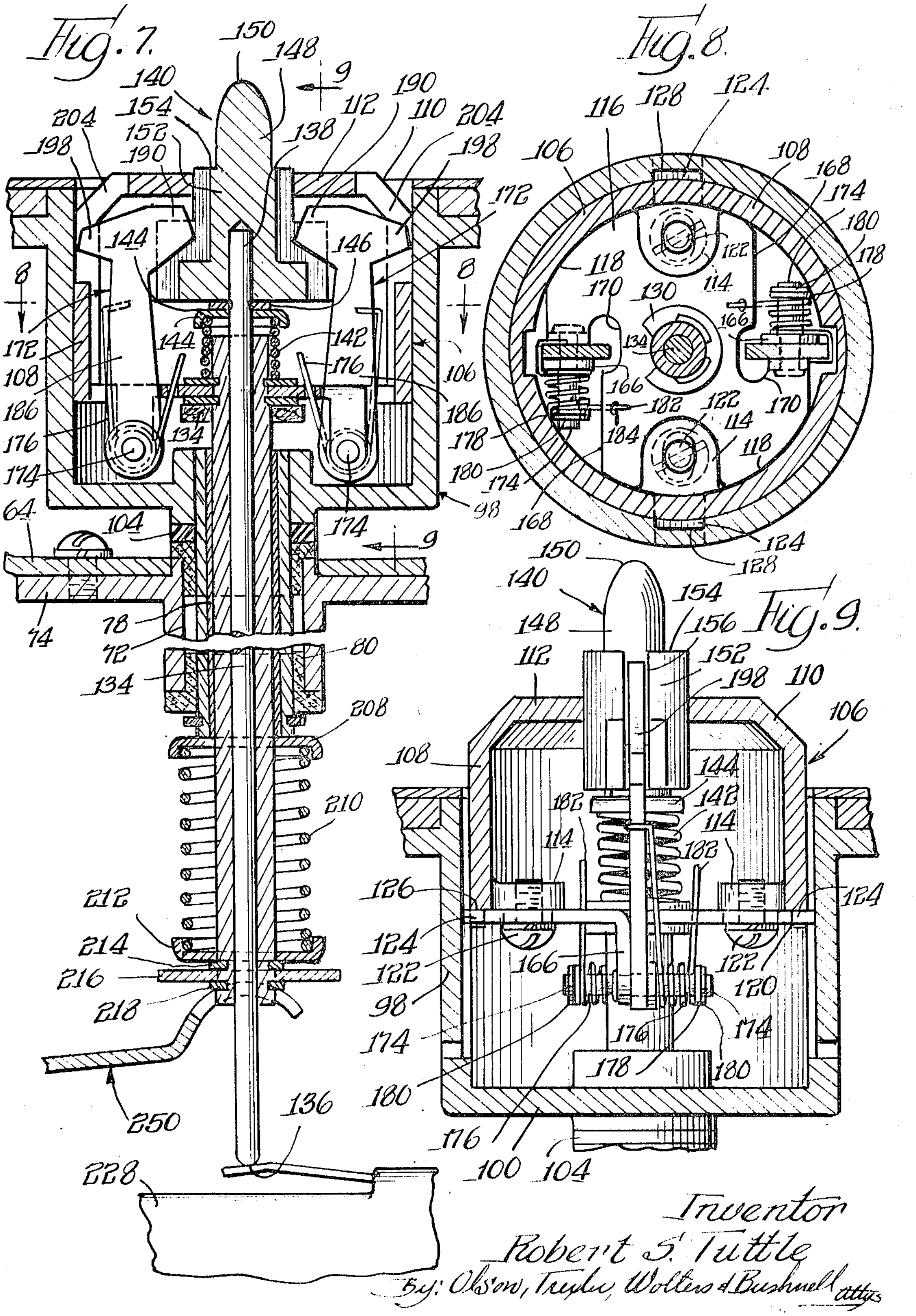
FIG. 7 is a sectional view similar to FIG. 5, showing the parts in a different position of operation.
FIG. 8 is a horizontal sectional view taken substantially along the line 8—8 in FIG. 7.
FIG. 9 is a vertical sectional view taken substantially along the line 9—9 in FIG. 7.

A vertically elongated tubular bearing housing 72 (FIGS. 3, 5 and 7) extends through the sub-base or plate 64 and depends therefrom. The bearing housing 72 is provided with a radially extending flange 74 secured to the underside of the plate 64 by means such as screws 76. Bearing bushings 75 and 77 are mounted at the top and bottom ends of bearing housing 72 and rotatably mount a steel tube 79. A sleeve bearing 78 is mounted in the tube 79 and mounts a hollow shaft 80. The shaft 80 is vertically shiftable within the bearing 78 as will be brought out hereafter.

Figures 3, 4:
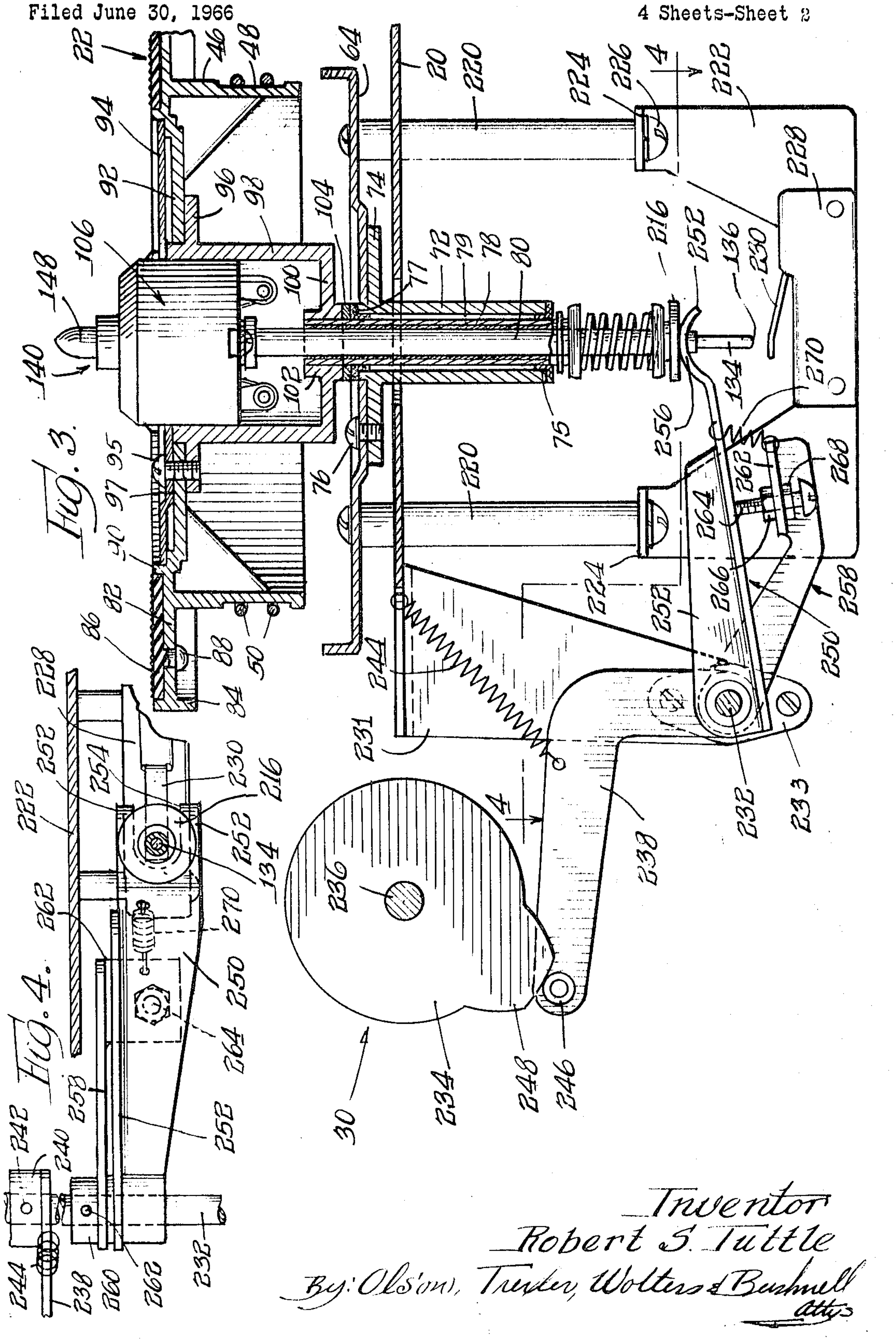
FIG. 3 is a vertical sectional view on a further enlarged scale taken through the turntable axis substantially along the line 3—3 in FIG. 2.
FIG. 4 is a horizontal view partly in section as taken along the line 4—4 in FIG. 3.

In FIG. 3, the turntable 22 will be seen to have a record supporting ring or flat bed portion 82 outwardly of the depending flange 46. A stiffening rim 84 extends above and below the bed 82, and a ribbed rubber or the like mat 86 is secured to the top of the bed, as by depending headed projections 88 on the mat fitting through suitable holes in the bed. An upstanding circular flange 90 at the inner edge of the bed 82 helps to position the ring-like mat.

The turntable is provided with a central depressed portion 92, and an ornamental plate 94 overlies this portion and is secured thereto as by screws 95 extending through radial depressions 97 in the plate 94 and the depressed portion 92, and threaded into a radially extending circumferential flange 96 on a depending cylindrical housing 98. The housing 98 is open at the top and is provided at the bottom with a transverse closing wall 100 having a boss 102 centrally thereof which extends both above and below the wall 100. The lower end of the boss rests on a washer 104 which may be of suitable anti-friction material, and this washer in turn lies on the top end of the bearing bushing 77. The steel tube 79 extends up into the boss 102, forming a force fit therewith and, as will be apparent, the turntable, the housing 98, and the steel tube 79 all turn as a unit in the bearing bushings 75 and 77.

A relatively large-diameter spindle 106 (FIGS. 3 and 5–9) is received in the cylindrical housing 98. The spindle 106 includes a cylindrical sidewall 108 of lesser height than the height of the cylindrical housing 98. The cylindrical sidewall 108 is topped by a bevelled or frusto-conical portion 110, and this is topped by a flat upper end 112. The bottom of the large spindle 106 is provided with a pair of inwardly extending ears 114, and a metal 116 of complex shape, having partly circular outer edge portions 118, is recessed in counterbore 120 and is held against the ears 114 by screws 122 extending through the plate and threaded into the ears. The plate 116 is provided with diametrically oppositely extending lugs 124 received in notches 126 in the bottom of the spindle cylindrical wall 108 for keying the plate to the spindle. Furthermore, the lugs 124 extend into vertical internal slots or recesses 128 in the inner surface of the housing 98 to key the spindle to the housing.

The plate 116 is secured on the hollow shaft 80 by means of C-washers 130 lying on opposite sides of the plate and snapped into suitable grooves 132 in the shaft. A felt washer 133 underlies the lowermost C-washer 132, serving as a shock absorber as will appear hereinafter.

A central shaft or rod 134 extends through the hollow shaft 80 and outwardly in both axial directions therefrom. The bottom end is rounded at 136, and the function thereof will be discussed hereinafter. The upper end is received in a bore 138 in a small diameter spindle member 140. A helical compression spring 142 exerting only a light vertcial force encircles the upper end of the hollow shaft 80 and bears down against the upper of the C-washers 130. The upper end is received in a downwardly concave spring retained washer 144 underlying a C-washer 146 snapped in a suitable groove in the rod 134. Thus, the spring 142 serves lightly to urge the rod 134 up. Although the rod forms a sliding fit in the spindle member 140, it also urges the spindle member up through abutment of the C-washer 146 against the underside of the spindle member.

The spindle member 140 is conveniently made of plastic material, and includes an upstanding central nose 148 of somewhat bullet shape, having a tapered or rounded upper end 150. The spindle member further includes an underlying cylindrical body 152 of larger diameter forming a right-angle shoulder 154 beneath the nose 148. Diametrically opposite and longitudinally extending radial slots 156 are provided on opposite sides of the body 152. Right-angle shoulders 158 are provided adjacent the lower end of the slots 156. Pairs of lateral flanges 160 and 162 extend from the body, and are provided with longitudinal slots 164 communicating with the slots 156.

The plate 116 is provided with a pair of down-turned ears 166 roughly diametrically opposed to one another, but lying on opposite sides of a common plane, as will be apparent shortly. The plate is provided with chordal edges 168 and approximately oval cutouts 170 leading to the down-turned ears 166 to provide adequate clearance for and about the ears.

A pair of upstanding latch members 172 lies in a common diametral plane, extending up from the inner faces of the ears 166 on which they are pivoted at their lower ends by crosspins 174. The pins are peened or otherwise suitably fixed to the depending ears 166, and hairpin type springs 176 are coiled about the pins and trapped between the respective latch members 172 and washers 178 held on the outer ends of the pins 174 by means of split-ring lock washers 180.

One arm 182 of each spring 176 extends up through a hole 184 in the plate 116. The other end 184 of each spring extends up along a shank 186 of each latch member and is curved or bent around the latch member at 188 whereby both latch members are urged in toward the spindle member 140.

The latch member shanks 186 are topped by radially inwardly projecting heels 190 having inner corners 192 urged by the springs 176 against the inner margins 194 of the slots 164. Tapered under edges 196 serve as cam surfaces, as will be brought out shortly hereinafter. In addition, the shanks 186 are topped by outwardly extending latch fingers 198 having relieved upper edges 200 and horizontal under edges 202.

Figures 5, 6:
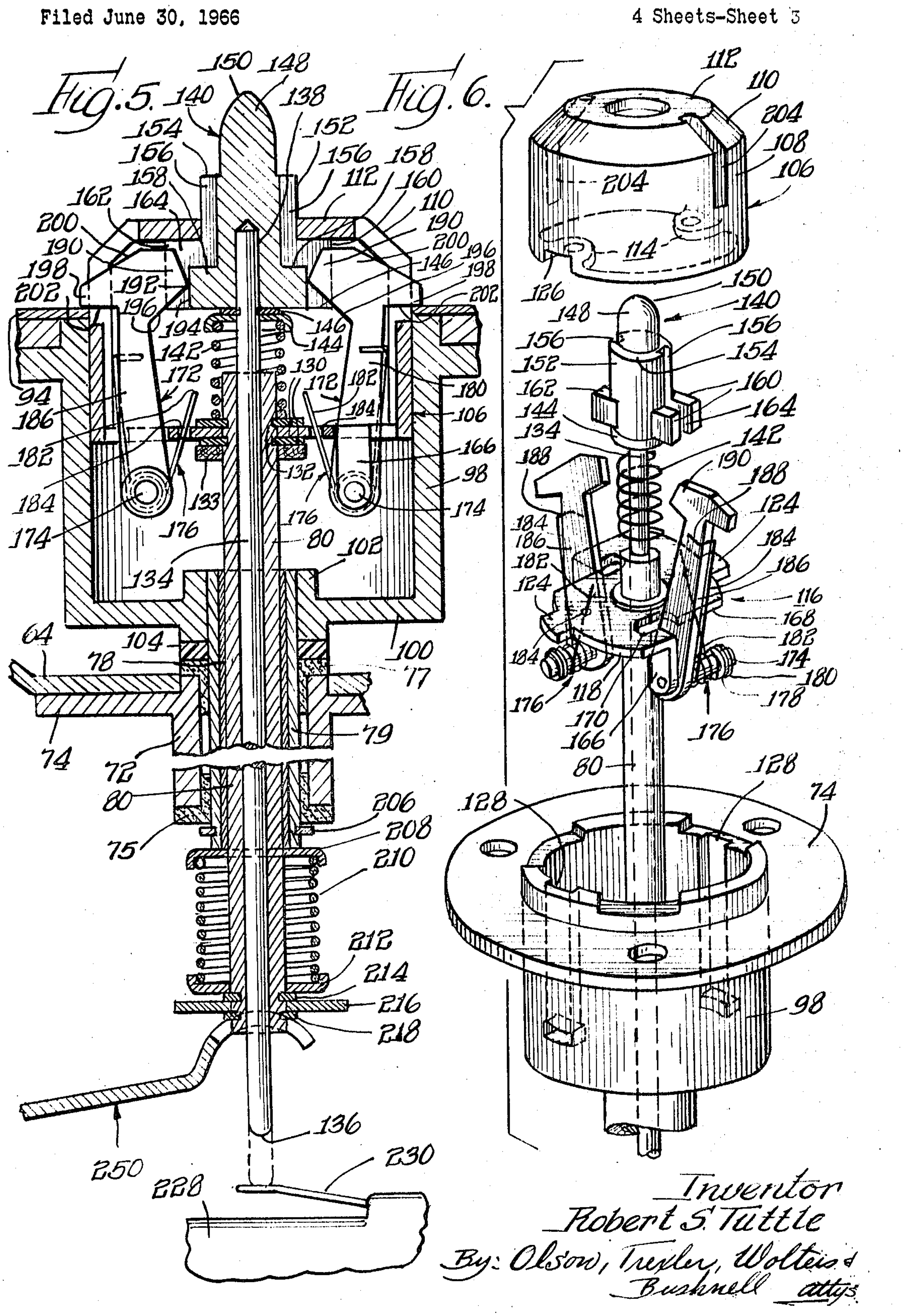
FIG. 5 is an enlarged sectional view through the axis of the spindles.
FIG. 6 is an exploded perspective view of the spindle mechanism.

In the position shown in FIG. 5, the latch fingers 198 are held extending out through vertical slots 204 in the large-diameter spindle member 106. In this position the latch fingers 198 overlie the plate 94 and the top ends of the cylindrical housing 98, thereby holding up the large-diameter spindle member 106. If the small-diameter spindle member 140 is depressed from the position shown in FIG. 5, to the position shown in FIG. 7, the heels 190 pass above the shoulder 158 whereby the springs 176 move the heels into the slots 156, retracting the latch fingers 198. This allows the entire assembly including the two spindle members to drop both gravitationally and under spring force, to be set forth immediately hereinafter.

The tube or shaft 79 is held against unwarranted upward movement in the bearing bushings 75 and 77 by a retaining ring such as a split-ring washer 206 received in a suitable groove therein. A downwardly concave spring retainer 208 surrounds the hollow shaft 80 immediately below the end of the tube 79 and bearing 78 and compresses a helical spring 210 down against an upwardly concave spring retainer 212 held in place on the shaft 80 by a split-ring washer 214 received in a groove therein. A relatively large diameter plain washer 216 is positioned beneath the split-ring washer 214, and another split-ring washer 218 is received in a groove immediately below the washer 216, whereby the washer 216 is trapped in place. As will be apparent, the spring 210 pushes down on the shaft 80 and resiliently tries to lower the spindle members 106 and 140. It is kept from doing this in the position of operation shown in FIG. 5 by the outwardly extending latch fingers 198. When the latch fingers are withdrawn as in FIG. 7 the spring 210 aids gravity in rapidly dropping the two spindle members.

A pair of posts 220 (FIG. 3) depends from the plate 64, being riveted thereto or secured by means such as screws passing through the plate and into the posts. The posts at their bottom ends have a vertical plate 222 secured thereto by means of right-angle, integral ears 224, screws 226 being passed through the ears and threaded into the bottom ends of the posts. An electric switch 228 is mounted on the side of the plate 222 and has an actuating lever or arm 230 directly below the bottom end 136 of the shaft or rod 134. When the spindle members 106 and 140 drop when the inner or smaller diameter spindle is unlatched, the rod 134 drops, thereby causing the lower end 136 thereof to engage the siwtch operating arm 230 thereby to close the switch.

A pair of brackets 231 depends from the plate 20 in spaced apart relation and carries a rock shaft 232 (see also FIG. 4) in a pair of bearing assemblies 233 respectively secured to the brackets 230. A cam 234 is included as a part of the main drive or control mechanism 30, and is fixed on a main drive shaft 236 for rotation therewith. An L-shaped lever 238 is fixed to the shaft 232 by means such as a hub 240 welded or otherwise permanently fixed to the lever 238 and having a pin or set screw 242 fixing it to the shaft. A helical spring 244 is tensioned between the upper arm of the lever 238 and an anchor hole in the plate 20 and holds a cam follower roller 246 at the outer end of the lever 238 against the periphery of the cam 234. As will be seen, the cam is mainly circular, with a raised protuberance, lobe, or active portion 248 thereon.

A forked lever 250 having a reinforcing flange 252 is pivotally mounted on the saft 232 relatively adjacent the front end thereof, and has a bifurcated outer end comprising tines 252 having an opening or recess 254 therebetween. The tines straddle the depending hollow shaft 80 and are convex upwardly at 256, bearing against the underside of the washer 216.

An operating lever 258 is fixed on the shaft 232 immediately adjacent the lever 250, by means such as a hub 260 and pin or set screw 262. The lever 258 has a substantially horizontal, laterally extending flange 262 at its outer end underlying the lever 250 and through which passes a positioning screw 264, the screw being positioned by suitable means such as a self-locking nut 266 having structure 268 thereon extending through an aperture in the flanges 262. A short helical spring 270 is stretched between suitable apertures in the flanges 262 and the lever 250, thereby holding the lever 250 down against the upper end of the screw.

At the end of a record playing operation the lead-in groove at the center of the record causes the pickup arm 26 to move inwardly beyond a predetermined limit, thereby tripping suitable control mechanism (not shown, but known in the art). Such operation of the control mechanism causes the main drive shaft 236 to rotate a sufficient extent to place the protuberance 248 against the cam follower roller 246, thereby rocking the shaft 232 and raising the lever 250 up under the washer 216 to cause lifting of the spindles 106 and 140, thereby allowing the spring 142 to force the smaller diameter spindle portion 140 up, camming the latch members 172 out, again to latch the spindles in raised position. As will be apparent, if the lever 250 lifts up when the spindle members 106 and 140 are already in raised position, it will have no effect on latching the spindle members in raised position.

OPERATION

When one or more coins are deposited in the coin mechanism associated with the apparatus as shown herein, and suitable manual controls are operated to effect a selection, electric controls of more or less conventional construction effect operation of the magazine 16 to bring the proper record opposite the extractor arm 34. This arm picks up the record and deposits it on the turntable with the proper side up, whereupon the pickup arm is moved over and the pickup stylus thereof is set down on the record. The movements are effected in accordance with the main drive mechanism 30. If the record is a 45 r.p.m. record with a large center hole, the center hole fits nicely over the large diameter spindle 106, being in close contact therewith. The frusto-conical portion 110 of the large diameter spindle insures exact centering. The speed control mechanism including the two-diameter spindle 58 and idler wheel 56 normally drives the turntable at 45 r.p.m. At the end of a playing cycle, the pickup arm 26 is returned to rest position, and the forked lever 250 lifts up beneath the washer 216, tending to restore the spindle members to idle position.

If the record placed on the turntable is a 33⅓ r. p.m. record with a small center hole, the center hole fits neatly over the spindle nose 148 and the adjacent portion of the record abuts the shoulder 154. The weight of the record is sufficient to depress the small diameter spindle member 140 against the force of the spring 142. The weight of the record is augmented by the downward movement of the extractor arm 34 in placing the record on the turntable. When the small diameter spindle is depressed, the parts move from the position of FIG. 5 to the position of FIG. 7, whereupon the latch fingers 198 are withdrawn and the large diameter spindle drops, the record being centered by the small diameter spindle nose 148. Such dropping causes the bottom end 136 of the rod 134 to engage and depress the switch arm 230 thereby actuating the switch 228 to effect a speed change. At the end of a record playing operation, the action is as before except that this time the forked lever 250 actually raises the spindle members to idle position, the members thereupon being positively locked in this position until another 33⅓ r.p.m. record is placed on the turntable. As will be understood, the extractor arm 34 raises the record which has just been played from the surface of the turntable before the spindles are raised.

The specific example of the invention as herein shown and described will be understood as being for illustrative purposes. Various changes in structure will no doubt occur to those skilled in the art, and will be understood as forming a part of the present invention insofar as they fall within the spirit and scope of the appended claims.

The invention is claimed as follows:

1. A two-speed phonograph turntable ocnstruction comprising a turntable, means mounting said turntable for rotation, means for rotatably driving said turntable at a selected speed, a relatively large diameter spindle coaxially mounted relative to said turntable and projecting from the surface of said turntable for centering a record with a relatively large diameter center hole thereon, said relatively large diameter spindle being retractable, means positively latching said relatively large diameter spindle in a projected position against retraction, a relatively small diameter spindle extending axially beyond said relatively large diameter spindle and coaxial therewith for centering a record with a relatively small center hole, and including a projection engageable by a record with a small center hole to depress said relatively small diameter spindle, and means operatively interconnecting said relatively small diameter spindle and said latching means to unlatch said latching means as an incident to positioning a record with a small center hole on said small diameter spindle, thereby to effect retraction of said relatively large diameter spindle.

2. A two-speed phonograph turntable construction as set forth in claim 1 wherein said projection comprises a substantially peripheral shoulder.

3. A two-speed phonograph turntable construction as set forth in claim 1 wherein said latch means is disposed within said relatively large diameter spindle and extends outwardly therefrom for latching relative to said turntable.

4. A two-speed phonograph turntable construction as set forth in claim 3 and further including means resiliently urging said latch means inwardly relative to said large diameter spindle, said relatively small diameter spindle having means thereon blocking said latch means against inward movement, said relatively small diameter spindle being moved by a record with a small center hole, to unblock said latch means.

5. A two-speed phonograph turntable construction as set forth in claim 1 wherein said small diameter spindle is retractable axially with respect to said turntable in response to the placing of a record with a small center hole thereon, and wherein said two-speed phonograph turntable construction further includes speed control means positioned on the side of said turntable opposite the record engaging side, and is operatively coupled to said turntable for changing the rotational speed thereof, and means operatively interconnecting said speed control means and said small diameter spindle to operate said speed control means by way of axial shifting of said small diameter spindle.

6. A two-speed phonograph turntable construction as set forth in claim 5 wherein the speed control means comprises an electric switch, and further including a rod extending coaxially from said relatively small diameter spindle and engageable with said electric switch when said relatively small diameter spindle is moved axially by engagement with a record having a small center hole.

7. A two-speed phonograph turntable construction as set forth in claim 1 and further including spring means loading said relatively large diameter spindle toward retracted position.

8. A two-speed phonograph turntable construction as set forth in claim 1 wherein said turntable is positioned substantially horizontally, said relatively large diameter spindle being gravitationally urged toward retracted position.

9. A two-speed phonograph turntable construction as set forth in claim 8 and further including spring means loading said relatively large diameter spindle toward retracted position.

10. A two-speed phonograph turntable construction comprising base means, a turntable having a substantially flat front surface for receiving a record to be played, means rotatably supporting said turntable from said base means, means acting between said base means and said turntable to rotate said turntable at a selected speed, a cylindrical housing disposed centrally of said turntable, said housing opening forwardly of said turntable front surface and extending rearwardly thereof, a relatively large diameter spindle in said housing and axially movable therein between an extended position forward of said front surface for centering a record with a relatively large diameter center hole and a retracted position no farther forward than said front surface, said large diameter spindle having lateral opening means therein, positive latching means extending laterally out through said opening means and operably engaging said turntable positively to latch said relatively large diameter spindle against said extended position, said relatively large diameter spindle having an axial opening at its outer end, a relatively small diameter spindle extending through said aperture axially beyond said large diameter spindle and adapted to position a record with a relatively small center hole, and resilient means urging said relatively small diameter spindle to extended position forward of said relatively large diameter spindle, said relatively small diameter spindle being operatively connected with said latch means positively to latch said large diameter spindle in extended position, said relatively small diameter spindle having an abutment thereon engageable by a record having a relatively small diameter center hole to move said relatively small diameter spindle axially rearwardly and into said relatively large diameter spindle, the operative interconnection of said relatively small diameter spindle and said latching means acting to release said latching means to permit movement of said relatively large diameter spindle to retracted position.

11. A two-speed phonograph turntable construction as set forth in claim 10 and further including spring means resiliently urging said latch means inwardly of said relatively large diameter spindle, said relatively small diameter spindle having a portion engageable by said latch means to resist inward movement thereof, axial movement of said relatively small diameter spindle under the influence of a record having a small center hole allowing inward movement of said latch means.

12. A two-speed phonograph turntable construction as set forth in claim 11 wherein said latch means includes at least two levers pivotally mounted within said relatively large diameter spindle and having portions thereof projecting outwardly therefrom.

13. A two-speed phonograph turntable construction as set forth in claim 10 and further including an electric switch for speed control disposed rearwardly of said turntable, and an axially disposed rod connected to said relatively small diameter spindle and movable therewith to operate said switch to effect speed selection.

14. A two-speed phonograph turntable construction comprising base means, a turntable having a substantially flat horizontal surface for receiving a record to be played, means rotatably supporting said turntable from said base means and including a vertically elongated bearing tube, means acting between said base means and said turntable to rotate said turntable at a selected speed, a cylindrical housing disposed centrally of said turntable, said housing opening forwardly of said turntable front surface and extending rearwardly down therefrom, a hollow shaft extending through said vertically elongated tube and fixed to said cylindrical housing as a part of the means for mounting the turntable, a relatively large diameter spindle in said housing and axially movable therein between and extended position above said front surface for centering a record with a relatively large diameter center hole and a retracted position no further forward than said front surface, a hollow spindle shaft fixed to said relatively large diameter spindle and extending below said first-mentioned hollow shaft, said large diameter spindle having lateral opening means therein, latch members pivotally mounted within said relatively larged diameter spindle and extending therefrom into engagement with said turntable positively to latch said relatively large diameter spindle in raised extended position, said relatively large diameter spindle having an axial opening at its outer end, a relatively small diameter spindle extending through said aperture axially above and beyond said relatively larger diameter spindle and adapted to position a record with a relatively small center hole, an inner small spindle shaft extending through said hollow spindle shaft and extending axially therebeyond in both directions and engaging said relatively small spindle and axially movable therewith, resilient means urging said relatively small diameter spindle to extended raised position above said relatively large diameter spindle, said relatively small diameter spindle having a shoulder thereon engageable with a record having a relatively small diameter center hole for lowering said relatively small diameter spindle, said relatively small diameter spindle having abutment means thereon holding said latch members in extended position when said relatively small diameter spindle is in extended position, resilient means urging said latch members into retracted position within said relatively large diameter spindle, said relatively small diameter spindle upon downward movement moving said abutment means from said latch members to allow inward movement thereof to unlatch said relatively large diameter spindle, spring means acting between said first hollow shaft and said hollow spindle shaft and resiliently urging said hollow spindle shaft down and lowering said spindles upon unlatching of said latch members, and lifting means acting beneath said hollow spindle shaft to lift said hollow spindle shaft to spindle extended position at the end of a record-playing operation, and an electric speed control switch mounted below said small diameter spindle shaft and engageable thereby upon lowering of said relatively large diameter spindle to effect speed selection.

References Cited

UNITED STATES PATENTS 2,673,089 3/1954 Osborne ---------- 274—39 X
2,762,627 9/1956 Johnson ------------ 274—39
3,034,795 5/1962 Guest -------------- 274—39

SAMUEL S. MATTHEWS, Primary Examiner